Figure 1:
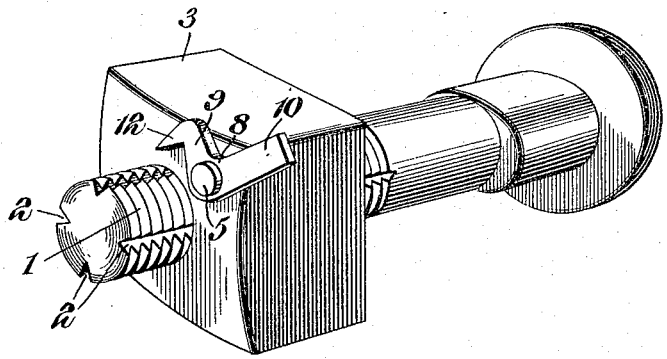

L. G. BOWERSOCK.
NUT LOCK.
APPLICATION FILED OCT. 21, 1915.

1,201,248.

Patented Oct. 17, 1916.

WITNESSES:
M. C. Hanrahan
Howard D. Orr

L. G. Bowersock, INVENTOR,

BY E. G. Siggers

Attorney

UNITED STATES PATENT OFFICE.

LEODA G. BOWERSOCK, OF LIMA, OHIO.

NUT-LOCK.

1,201,248.

Specification of Letters Patent.

Patented Oct. 17, 1916.

Application filed October 21, 1915. Serial No. 57,181.

*To all whom it may concern:*

Be it known that I, LEODA G. BOWERSOCK, a citizen of the United States, residing at Lima, in the county of Allen and State of Ohio, have invented a new and useful Nut-Lock, of which the following is a specification.

This invention relates to nut locks, and the object is to provide a device which will prevent the nut from turning upon the bolt in a direction to unscrew the same, without the necessity of materially altering the standard nuts and bolts now in use, or the employment of springs or intricate parts which may easily become inoperative or broken.

A full and complete understanding of the invention may be obtained from a careful consideration of the following detailed description, taken in connection with the accompanying drawing forming a part of this specification; it being understood that while the drawing shows a practical form of the invention, the latter is not confined to strict conformity therewith, but may be changed or modified, as long as such changes or modifications mark no material departure from the essential features of the invention, as specifically pointed out in the claims hereto appended.

Figure 2:
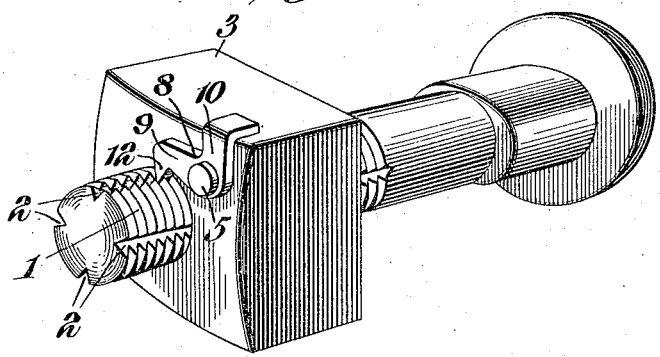
Figure 3:
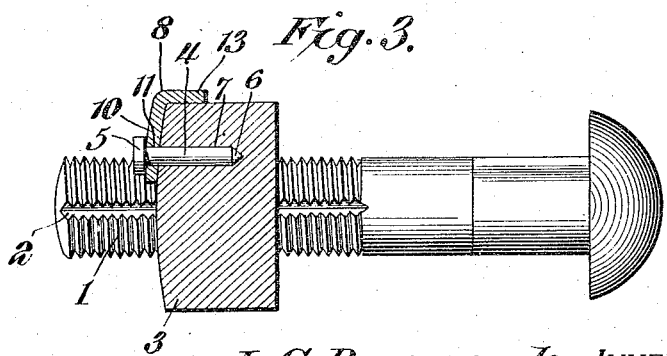

In the drawing, in which like reference characters designate like parts in each of the several figures: Figure 1 is a perspective view of a nut and bolt having the improved lock applied thereto. Fig. 2 is a similar view showing the position of the parts, after the nut has been sufficiently tightened and the dog bent over to prevent the nut from loosening. Fig. 3 is a vertical sectional view through the pivotal means for the locking dog.

Referring to the drawing there is shown a standard bolt, which is threaded throughout the greater portion of its length, as indicated at 1. A plurality of longitudinal grooves 2 are provided in the threaded portion. While four of such grooves are shown, it is to be understood that a greater or a lesser number may be employed. These grooves constitute the only alteration necessary to be made in the bolt, and it will be obvious that the same may be easily formed thereon in the process of manufacture.

An ordinary nut 3 is adapted to be threaded onto the shank of the bolt in the usual manner. This nut has provided on its outer face an outstanding pivotal pin 4, having an enlarged head 5 provided on its outer end and a tapered point 6 on the inner end. This pin 4 is adapted to be driven into a suitable aperture 7 formed by boring inwardly from the outer face of the nut 3 at a point about half way from the center of the bolt to one corner of the nut.

A locking dog 8 is formed of sheet iron or some other malleable metal and is in the form of a bell crank lever, having an inner engaging arm 9 and another, and somewhat longer, locking arm 10, extending substantially at right angles to each other. A suitable aperture 11 is provided at the angle of said arms, and is of a size to snugly fit the pin 4 and to frictionally engage the same at a point between the head 5 and the adjacent front face of the nut 3, to hold the locking dog at any desired position during the operation of tightening the nut.

The arm 9, which extends from the pivot pin 4 inwardly, over-hangs the threaded portion 1 of the shank of the bolt, and is provided on its inner edge, at the end, with an inwardly directed tooth 12, suitably formed to fit the longitudinal grooves 2. While these grooves and tooth 12 are shown in the drawing as being of V shape, they may have any other cross-sectional contour, for it is to be understood that when the tooth 12 is forced or depressed into that groove 2, which may lie in proper position to receive it, the same remains in engagement with the groove permanently.

While in the act of turning up the nut 3 upon the shank of the bolt, the tooth 12 is held away from the threads 1 by reason of the frictional engagement of the dog 8 with the pivot pin 4, and, when the nut 3 has reached the proper position on the bolt to tighten the parts being held thereby, it is only necessary to press said tooth into the nearest groove 2, and the extended arm 10 will reach beyond the adjacent face of the nut 3 a short distance, when, by reason of the malleable nature of the dog 8, it is only necessary to hammer the extended end of the arm 10 over upon said face as indicated at 13 in Fig. 2. This extension 13, as will readily be seen, acts as a lock to prevent the dog 8 from swinging in either direction upon its pivotal pin 4, and all that is necessary is to drive the pin 4 farther into its seat 7 to cause a wedging of the same therein, when the parts are rigidly held in their proper position to prevent any possibility of accidental loosening of the nut on the bolt.

An effective means for locking nuts upon bolts is provided by the means hereinbefore described, consisting merely of two parts, which are easily applied to any nut and are of such a nature as to permit of their manufacture at a minimum cost.

This invention is distinguishable from nut locks employing a spring-actuated pawl to engage a grooved bolt, for by the construction herein shown and described a springless nut lock is provided which may be applied to a nut without recessing the latter.

I claim:

1. A nut lock comprising a bolt having its threaded portion longitudinally grooved, a nut threaded to engage the bolt, a dog pivoted on the outer face of the nut, said dog consisting of two arms arranged at an angle to each other, one of the arms being provided with a projecting tooth to engage with the groove of the bolt, and the other arm extending beyond the edge of the nut and bent over the same to hold the tooth in engagement with the groove, whereby a springless nut lock is provided.

2. In a nut lock, the combination with a bolt having a longitudinally grooved threaded portion, of a nut adapted to be screwed onto the same and having an outstanding headed pin arranged on the outer face and adjacent to one corner thereof said pin being driven into an aperture of the nut, a locking dog consisting of two arms arranged at an angle to each other, pivotally mounted on the pin at the junction of said arms, and an inwardly-projecting tooth provided on the end of one of the arms and adapted to enter one of the grooves of the bolt, the other arm extending outwardly beyond the adjacent edge of the nut and bent over against the side of the nut to hold the tooth in engagement with the groove, whereby a springless nut lock is provided.

In testimony, that I claim the foregoing as my own, I have hereto affixed my signature in the presence of two witnesses.

LEODA G. BOWERSOCK.

Witnesses:
SCOTT WILKINS,
FRED GOOD.